United States Patent [19]
Stefely

[11] Patent Number: 5,301,475
[45] Date of Patent: Apr. 12, 1994

[54] FIRE STOP DEVICE

[76] Inventor: Stephen F. Stefely, 941 Euclid Ave., Elmhurst, Ill. 60126

[21] Appl. No.: 25,161

[22] Filed: Mar. 1, 1993

[51] Int. Cl.⁵ .............................................. F16K 17/36
[52] U.S. Cl. .......................................... 52/1; 52/232; 52/317; 137/527.6; 137/75; 137/360
[58] Field of Search ........................ 52/1, 317, 232; 248/325, 56, 57, 230, 231.5; 137/72, 75, 527.8, 360; 251/149.2

[56] References Cited

U.S. PATENT DOCUMENTS

| 3,726,050 | 4/1973 | Wise et al. | 52/1 |
| 3,730,216 | 5/1973 | Arnelt et al. | 251/149.2 |
| 4,136,707 | 1/1979 | Gaillot et al. | 137/75 |
| 4,270,724 | 6/1981 | McMullen | 248/231.5 |
| 4,494,564 | 1/1985 | Lukacz | 137/527.6 |
| 4,495,859 | 1/1985 | Janke et al. | 137/537.6 |
| 4,928,911 | 5/1990 | Hardtke | 248/230 |
| 5,103,609 | 4/1992 | Thoreson et al. | 52/232 |

Primary Examiner—Carl D. Friedman
Assistant Examiner—Winnie Yip
Attorney, Agent, or Firm—John L Hutchinson

[57] ABSTRACT

A fire stop device adapted to close an opening in a wall or floor having a plastic pipe extending through the opening when the pipe is destroyed by fire which comprises a base plate surrounding the opening having a collar projecting at right angles and attached to the base plate and adapted to surround the plastic pipe and means for automatically closing the collar opening when the plastic pipe is destroyed by fire.

5 Claims, 3 Drawing Sheets

FIRE STOP DEVICE

The present invention relates to a mechanical device for sealing off an opening in a building wall, floor or ceiling provided with a plastic pipe extending through the opening to prevent penetration of fire through the opening when the pipe is destroyed by fire.

In the walls, floors or ceilings of buildings, openings are provided through which are passed plastic pipe for housing electrical conduits or transmitting water or other fluids. In the event of a fire the plastic from which the pipes are formed, such as polyvinyl chloride, is destroyed and can thereby allow the flames and smoke to penetrate the opening to the next area or level of the building.

In most cases building codes require that a putty-like intumescent fire retardant sealant or caulking be installed in the opening vacant space surrounding the pipes. These sealants have the ability to expand upon contact by heat or flames and, as the pipe melts under the influence of the heat generated by a fire, the sealant expands and fills the void created. Illustrative of such sealants is the composition disclosed in U.S. Pat. No. 5,059,637, as well as those compositions disclosed in the various patents cited in this patent. Numerous techniques and systems for using the caulking or sealant can be found in the Fire Resistant Directory 1991 published by Underwriters Laboratory.

Most if not all of the aforementioned sealants are reasonably sufficient to perform their function of closing openings having a maximum diameter of about two inches to prevent penetration by fire or smoke. However, with openings above two inches in diameter the function of the sealants and particularly with openings in the four inch range and above it is substantially impossible to provide a sealant which when activated will expand sufficiently to fill the opening.

Accordingly, the present invention is intended to provide a mechanical closure for openings in floors, walls and ceilings upon the melting of plastic pipe as a supplement to or in lieu of the normal fire retardant sealant or caulking.

Figure 1:
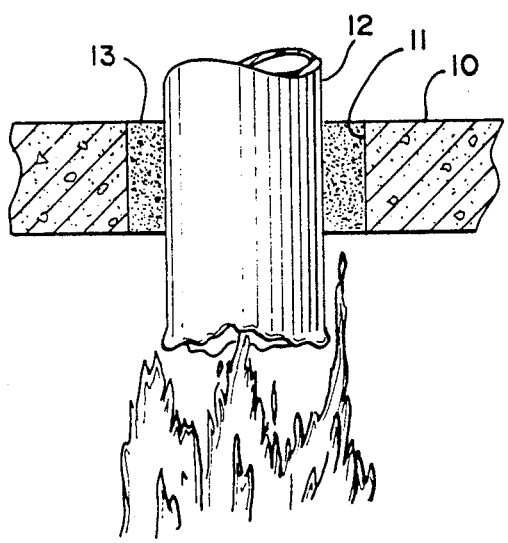
FIG. 1 is an elevation, partly in section of plastic pipe passing through a floor.

Turning now to the drawing and initially to FIGS. 1-3, the numeral 10 designates a floor, wall or ceiling, which, for purposes of further description in the specifications hereinafter will be frequently referred to as a floor. In many commercial buildings the floor is frequently constructed of cement. A transverse opening, indicated generally by the numeral 11, is present in the floor 10 through which extends a plastic pipe 12, such as a polyvinyl chloride tube, passing from a lower level through the floor 10 and adapted to serve as an open conduit or housing between levels.

Interdisposed between the surface of the opening 11 and the outer surface of the pipe 12 is an intumescent fire retardant caulking 13. The caulking, as indicated hereinabove, is intended to be activated and expand upon exposure to flame and heat and, accordingly, close off the opening 11 as the pipe is melted, as indicated generally by the numeral 14 of FIG. 2. As described above, the use of an intumescent caulking is normally satisfactory for openings up to about two inches in diameter. However, also as indicated, for openings larger than two inches the caulking cannot expand transversely or in thickness sufficiently to provide closure for the opening, thereby allowing flame and smoke to penetrate to the next area or level. This adverse condition is shown in FIG. 3 which is intended to illustrate conditions wherein the opening 11' is made larger than the opening 11 of FIG. 2. In FIG. 3 it will be noted that the intumescent caulking has not sufficiently expanded, as indicated generally by the arrow 15, so as to close off a larger opening or prevent further contact of heat or flame with the plastic pipe 12 thereby leaving access of flame and smoke to the next level.

Accordingly, it is a primary object of this invention to provide a device which will supplement the use of intumescent fire retardant compositions by providing a positive mechanical means which will seal or close an opening in a floor or wall thereby preventing access of smoke and flame to an adjacent area.

A further object is to provide a device of the foregoing type which is economical and easy to install.

Figure 4:
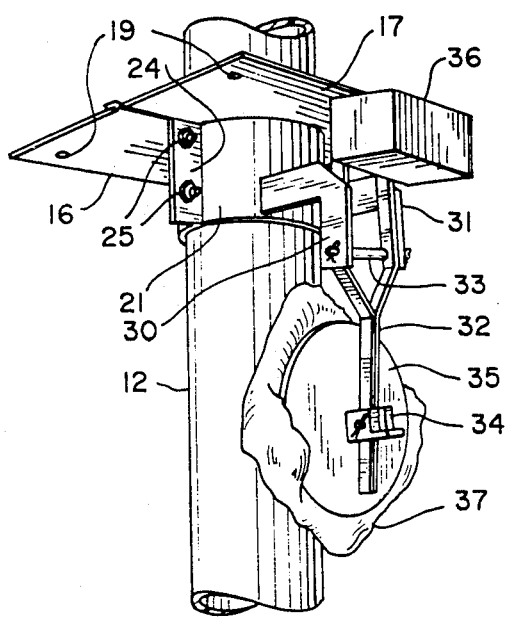
FIGS. 4 and 5 are slightly different elevations, partly in section, showing the device of the present invention in place prior to activation.
Figure 5:
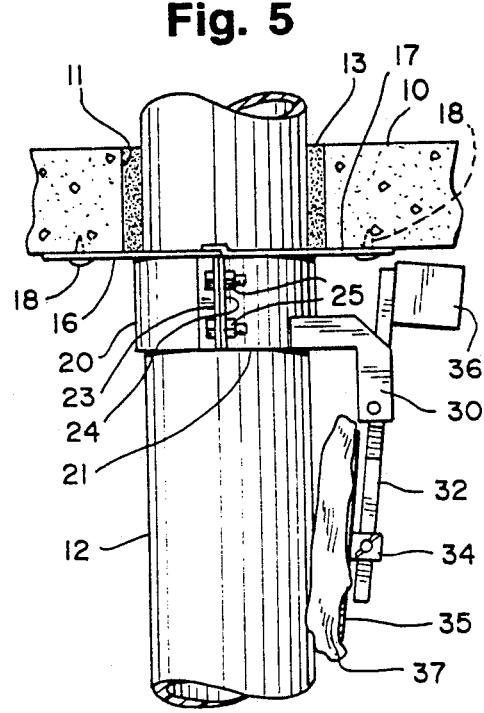
Figure 6:
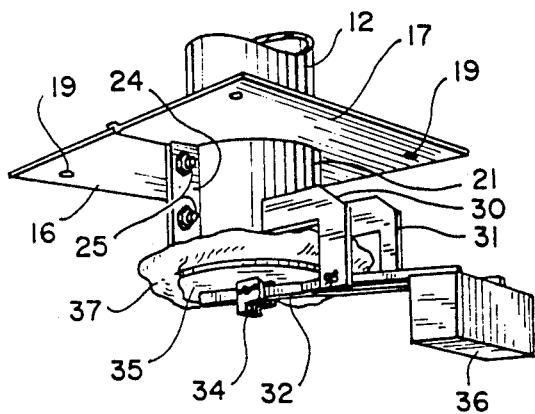
FIGS. 6 and 7 are slightly different elevations, partly in section, showing the device of the present invention fully activated.
Figure 7:
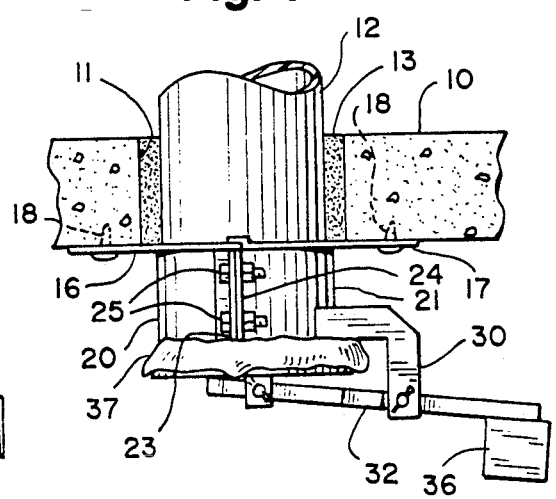
Figure 9:
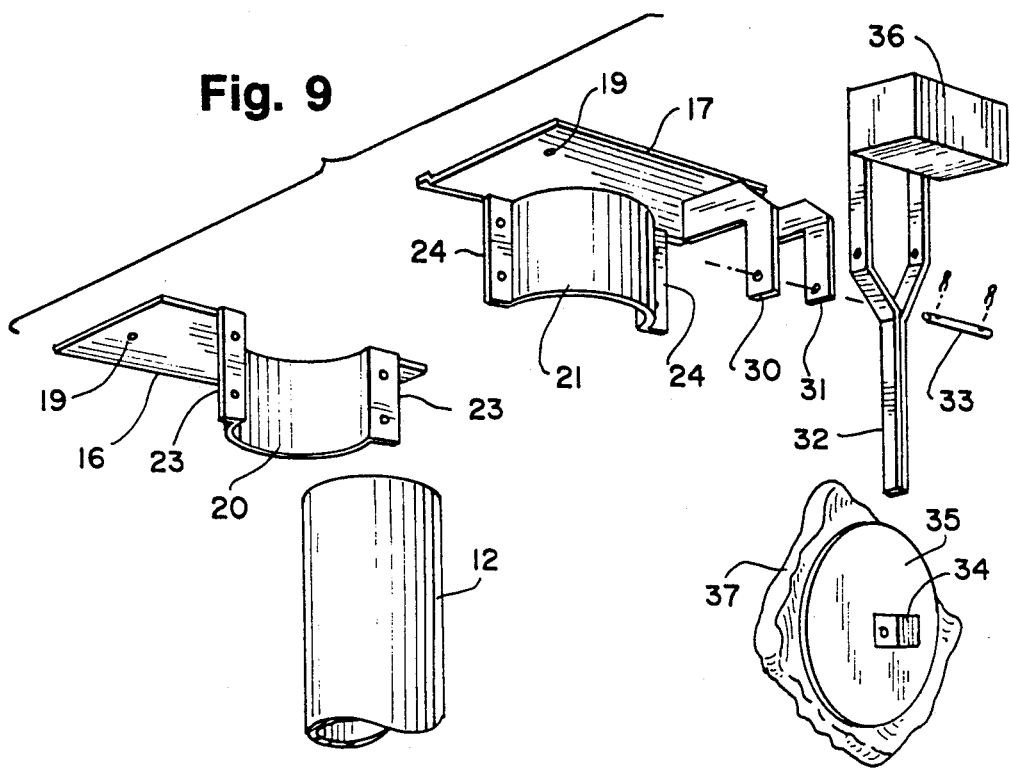
FIG. 9 is an exploded view of the various parts of the device of the present invention.
Figure 8:
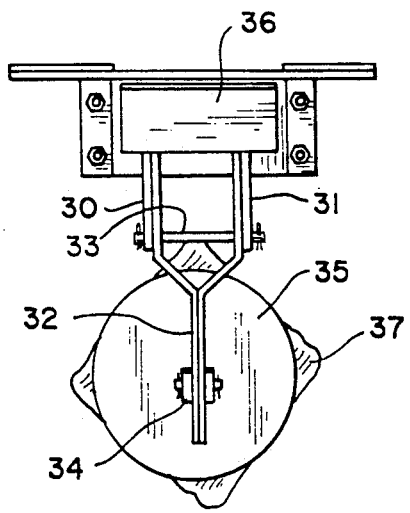
FIG. 8 is an elevation of the device of the present invention showing an alternate view of the device assembly.

In describing the essential details of the device reference will be made to FIGS. 4-9, with FIGS. 4 and 5 illustrating the open or unactivated position and FIGS. 6 and 7 demonstrating the activated or closed position of the device.

Figure 2:
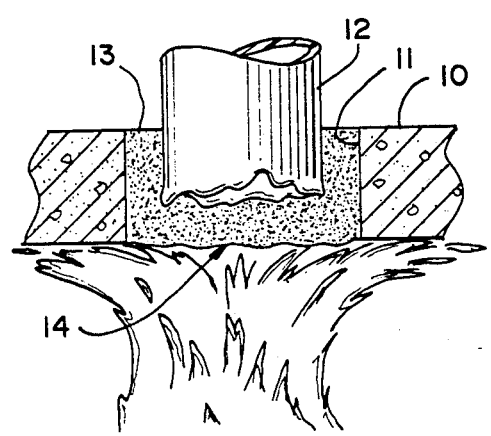
FIG. 2 is an elevation, partly in section, of a pipe partly melted by heat wherein the opening has been sealed off.
Figure 3:
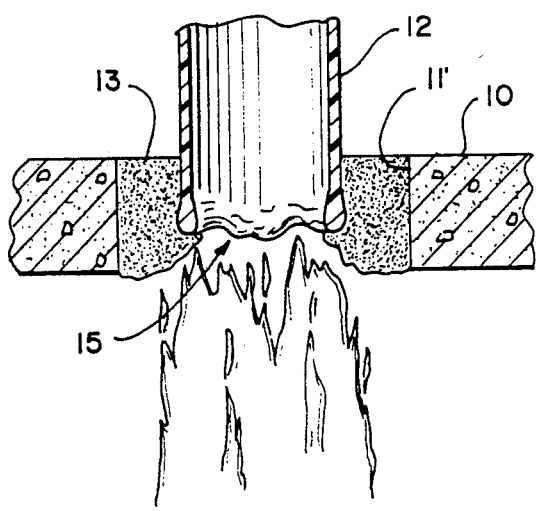
FIG. 3 is a further elevation, partly in section, of a pipe partly melted wherein the opening has not been sealed.

As in the previously described FIGS. 1-3, the numeral 10 represents a floor, which may comprise cement, numeral 11 an opening between floors, numeral 12 a plastic pipe extending through opening 11 and the numeral 13 a fire retardant intumescent composition. Secured to the surface of the underside of the floor 10 are two complementary base members or plates 16 and 17, which may be secured to the undersurface by studs 18 inserted in appropriate holes 19. Attached to each base member, respectively, are semi circular sleeves 20 and 21, extending at a right angle to said base, which in the assembled position will form a circular collar surrounding the plastic pipe 12. The two semi circular sleeves can be secured to each other to form the circular collar by means of the flanges 23 and 24 using bolts 25. As shown, the plates 16 and 17 are adapted to completely close off the opening 11 except for the area through which the pipe extends.

Attached to the outer surface of sleeve 21 as shown in FIGS. 4-7 are two spaced-apart L-shaped brackets 30 and 31 between which is journaled a lever 32 held in pivotal position within the brackets by bolt 33 and extending longitudinally along the outer surface of the collar. The lower end of lever 32 projects below or beyond the lower or outer opening of the collar formed by sleeves 20 and 21. Secured to the lower section of lever 32 by a bracket 34 is a plate or closure 35 which will serve to eventually close the open end of the collar when the device is activated as hereinafter described. Attached to the opposite end of lever 32 is a weight 36. The construction and design of the lever 32, plate 35 and weight 36 is such mass that there is a constant bias for the weight to force the lever horizontally and, correspondingly, the plate 35 up against the opening formed by the lower edge of the collar. Such a movement of the lever is prevented by the presence of the plastic pipe 12 against which the plate 35 rests after installation of the device and pending subsequent activation. To insure a more fireproof closing when the device is activated a fire retardant pad 37 may be attached to plate 35.

As illustrated in FIGS. 4 and 5, in the unactivated position of the device the plate 35 is continuously pressed against plastic pipe 12 by the force and downward bias of weight 36. Upon dissolution or destruction of pipe 12 due to fire the plate 35 will be continually forced upward or toward the lower opening of the collar under the influence of the weight 36 until the plate rests against and closes the lower opening of the collar as shown in FIGS. 6 and 7. As a result of the position and design of the plates 16 and 17 and the activation of the plate 35 against the outer opening of the collar, the opening in the floor can be completely sealed, preventing penetration by fire and smoke to the next level upon destruction of the plastic pipe. With the device of this invention the caulking 13 serves only a supplemental function.

Once installed the device can remain in place indefinitely maintaining its ability to be activated at any time. The device will normally be constructed from a suitable metal such as steel. Due to its design its parts can be easily manufactured and installed at a construction site with minimum time and expense. Also, it will be appreciated that while weight 36 has been described for activating the device, a suitable spring means can be used as the activation mechanism.

Figure 10:
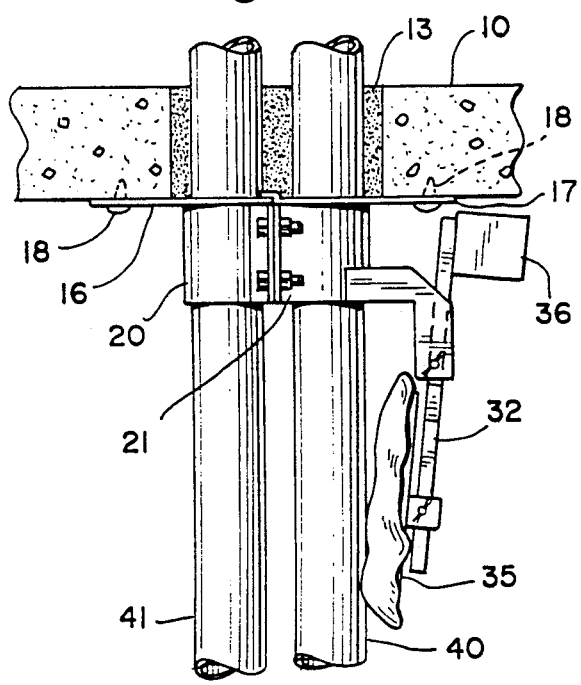
FIG. 10 is an elevation, partly in section, illustrating the use of the device with a plurality of pipes.

FIG. 10 is intended to illustrate the utility of the device when multiple plastic pipes are installed in an opening. Activation will, correspondingly, occur when the plastic pipes 40 and 41 are destroyed by fire.

While the device has been shown and described in use with a floor and vertical layout, it will be also understood that a substantially similar arrangement within the basic concept can be used for a wall wherein the device will be installed in a horizontal position with corresponding parts and activation mechanisms.

Having described the invention and certain of its embodiments the same is only intended to be limited by the scope of the following claims.

I claim:

1. A fire stop device for automatically closing a transverse opening in a floor or wall of a building having a plastic pipe extending through said opening when said pipe is destroyed by fire comprising
   a. A base adapted to be attached to the surface of the floor or wall surrounding and closing said opening, except for the area through which the pipe extends;
   b. an elongated collar attached to and extending at a right angle to said base adapted to surround said pipe;
   c. closure means attached to an outer surface of said collar adapted to automatically close an open end of said collar upon the destruction of said pipe by fire;
   d. said closure means including a bracket attached to and extending laterally from one side of the outer surface;
   e. a lever pivotally secured to said bracket and extending longitudinally along the outer surface of said collar with one end of said lever projecting beyond the end of said collar with said end provided with a plate to serve as a closure for the opening of said collar.

2. A device as described in claim 1 wherein the opposite end of said lever is provided with a counterweight of sufficient mass as to maintain the plate in continuous contact with the pipe and ultimately force the plate toward the collar so as to close the opening of the collar by said plate when the pipe is destroyed by fire.

3. A device for automatically closing a transverse opening in a floor or wall of a building having a plastic pipe extending through said opening when said pipe is destroyed by fire comprising
   a. two complementary bases adapted to be secured to the surface of the wall or floor surrounding and closing said opening except for an area through which the pipe extends, each base having attached thereto a complementary semi circular sleeve so as to form a circular collar surrounding said pipe;
   b. closure means attached to an outer surface of one of said semi circular sleeves and adapted to automatically close an outer opening of the collar formed by said complementary sleeves upon destruction of said pipe by fire.

4. A device as described in claim 3 wherein the closure means includes a laterally extending bracket provided with a pivotal lever one end of which projects beyond the opening formed by said sleeves and contains a closing plate complementary to the collar opening and the other end of which has attached thereto a weight such that closing of the collar opening will be due to gravitational force.

5. A device as described in claim 4 wherein a face of the closing plate has attached a fibrous fire retardant pad.

* * * * *